United States Patent [19]

Hoffman

[11] 3,917,560

[45] Nov. 4, 1975

[54] POLY (PHOSPHINE OXIDE) FLAME RETARDANTS FOR POLYMERS

[75] Inventor: Joseph Adrian Hoffman, Somerville, N.J.

[73] Assignee: American Cyanamid Company, Stamford, Conn.

[22] Filed: Dec. 23, 1974

[21] Appl. No.: 535,624

Related U.S. Application Data

[62] Division of Ser. No. 374,709, June 28, 1973, Pat. No. 3,895,048.

[52] U.S. Cl. .......................................... 260/45.9 NP
[51] Int. Cl.² ............................................ C08G 6/00
[58] Field of Search ............... 260/45.9 NP, 606.5 P

[56] References Cited
UNITED STATES PATENTS

| | | | |
|---|---|---|---|
| 2,754,320 | 7/1956 | Johnston | 260/45.9 NP |
| 2,881,147 | 4/1959 | Graham | 260/45.9 NP |
| 3,113,973 | 12/1963 | Hoffman et al. | 260/606.5 P |
| 3,116,317 | 12/1963 | Grayson et al. | 260/606.5 P |
| 3,213,057 | 10/1965 | Ritt et al. | 260/606.5 P |
| 3,284,543 | 11/1966 | Gillham et al. | 260/45.7 P |
| 3,306,937 | 2/1967 | Clampitt et al. | 260/606.5 P |
| 3,404,187 | 10/1968 | Kober et al. | 260/606.5 P |
| 3,501,556 | 3/1970 | Weil et al. | 260/606.5 P |
| 3,663,502 | 5/1972 | Murray et al. | 260/43.9 NP |
| 3,716,580 | 2/1973 | Maier | 260/606.5 P |
| 3,745,191 | 7/1973 | Daigle et al. | 260/606.5 P |
| 3,745,197 | 7/1973 | Toy et al. | 260/45.9 NP |
| 3,790,638 | 2/1974 | Kleiner et al. | 260/606.5 P |

Primary Examiner—V. P. Hoke
Attorney, Agent, or Firm—Frank M. Van Riet

[57] ABSTRACT

Compounds having the formula (A)

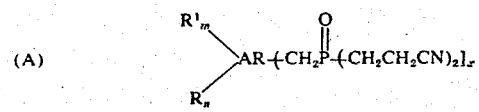

wherein R and R¹ are, individually, methyl, ethyl or methoxy radicals; AR is benzene, naphthalene or anthracene and when AR is benzene, $n$ and $m$ are, individually whole integers of 0–2, inclusive, $x$ is a whole integer of 2–6, inclusive and R and R¹ can combine to form a saturated, six-membered, hydrocarbon ring in conjunction with two adjacent carbon atoms of the benzene ring; when AR is naphthalene, $n$ and $m$ are, individually, whole integers of 0–3, inclusive, and $x$ is a whole integer of 2–4, inclusive; and when AR is anthracene, $n$ and $m$ are, individually, whole integers of 0–4, inclusive, and $x$ is a whole integer of 2–6, inclusive, and flame-retarded polymers containing the same, are disclosed.

9 Claims, No Drawings

POLY (PHOSPHINE OXIDE) FLAME RETARDANTS FOR POLYMERS

CROSS-REFERENCE TO RELATED APPLICATIONS

This application is a divisional of application Ser. No. 374,709, filed June 28, 1973 now U.S. Pat. No. 3,895,048; and is related to my copending application Ser. No. 374,728, filed of even date herewith, now U.S. Pat. No. 3,835,119, and entitled POLY (PHOSPHINE OXIDE)-AMMONIUM POLYPHOSPHATE FLAME-RETARDANTS.

BACKGROUND OF THE INVENTION

The use of alkylenebisphosphine oxides to flameproof thermoplastic polymers is known, see U.S. Pat. No. 3,284,543. These compounds, although effective flame-retardants for thermoplastics, are effective only at high concentrations of about 20–25% in most polymers. Moreover, these prior art compounds have been found to be relatively incompatible with many polymers such as, for example, polypropylene. As a result, they are extremely difficult to incorporate into such polymers by conventional extrusion and injection molding techniques since they tend to exude from the polymer. Consequently, uniform dispersions of the alkylenebisphosphine oxides are difficult to obtain. A third, sometimes more detrimental, disadvantage of these known flame-retardants is that they are relatively water-soluble and in certain applications of the flame-proofed polymers, such as in components of clothes washers and dishwashers, they tend to be extracted from the polymer. As a result, the polymer becomes more readily flammable and ultimately fails to pass the Underwriter's Laboratory test of acceptable flame-retardance.

SUMMARY

I have now discovered that these and other less objectionable deficiencies of the alkylenebisphosphine oxides can be overcome, and excellent flame-retardant properties can be achieved, by incorporating into thermoplastic polymers a compound conforming to the formula set forth hereinabove. These novel compounds impart flame-retardancy to thermoplastic polymers at relatively low concentrations, are easily incorporated into the polymer substrate and do not leach out of the polymer when it is used in conjunction with water after having been formed into a particular article of manufacture.

DESCRIPTION OF THE INVENTION INCLUDING PREFERRED EMBODIMENTS

The compounds found to be effective in flame-proofing thermoplastic polymers according to the present invention conform to at least one of the following formulae

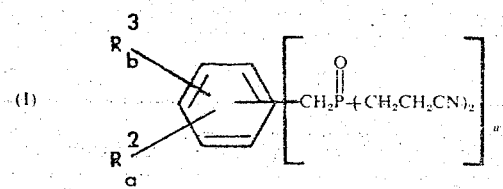

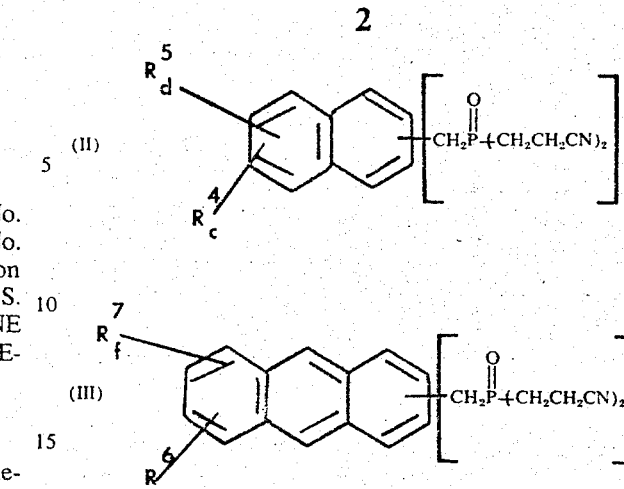

wherein $R^2$, $R^3$, $R^4$, $R^5$, $R^6$ and $R^7$ are, individually, methyl, ethyl or methoxy radicals, and $R^2$ and $R^3$ can combine to form a saturated, six-membered, hydrocarbon ring in conjunction with two adjacent carbon atoms of the benzene ring; $a$ and $b$ are, individually, whole integers of 0–2, inclusive; $c$ and $d$ are, individually, whole integers of 0–3, inclusive; $e$ and $f$ are, individually, whole integers of 0–4, inclusive; $w$ is a whole integer of 2–6, inclusive; $y$ is a whole integer of 2–4, inclusive; and $z$ is a whole integer of 2–6, inclusive.

Among the preferred compounds are those represented by Formula I, including 5,8-bis[bis(2-cyanoethyl)phosphonylmethylene]tetralin; 1,4-bis[bis(2-cyanoethyl)phosphonylmethylene]-2,3,5,6-tetramethyl benzene; 1,2,4,5-tetrakis[bis(2-cyanoethyl)phosphonylmethylene]benzene; 2,4,6-tris[bis(2-cyanoethyl)phosphonylmethylene]mesitylene; 1,4-phenylenebis[bis(2-cyanoethyl)phosphonylmethylene]; 2,4-bis[bis(2-cyanoethyl)phosphonylmethylene]-1,3,5-trimethyl benzene and the like.

Compounds falling within the scope of Formulae II and III include 1,5-bis[bis(2-cyanoethyl)phosphonylmethylene]naphthalene; 9,10-bis[bis(2-cyanoethyl)phosphonylmethylene]anthracene; 2,6-bis[bis(2-cyanoethyl)phosphonylmethylene]naphthalene; 2,3,6-tris[bis(2-cyanoethyl)phosphonylmethylene]naphthalene; 2,3,6-tris[bis(2-cyanoethyl)phosphonylmethylene]anthracene;2,6,9,10-tetra[bis(2-cyanoethyl)phosphonylmethylene]anthracene; 1,6-bis[bis(2-cyanoethyl)phosphonylmethylene]-2-methoxy naphthalene; 2,3-bis[bis(2-cyanoethyl)phosphonylmethylene]-6,7-diethylanthracene and the like.

The compounds of the instant invention are readily prepared by reacting bis(2-cyanoethyl)phosphine oxide with the appropriately substituted halomethyl aromatic compound, in accordance with the general reaction.

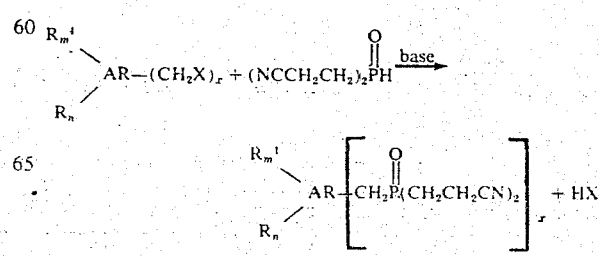

wherein X is a halogen and $x$, $m$, $n$, R, $R^1$ and AR are as set forth above.

The intermediate halomethylated aromatic compounds may conveniently be prepared by reacting the corresponding benzene; naphthalene or anthracene with formaldehyde and a hydrogen halide e.g. hydrogen chloride; hydrogen bromide etc., according to known procedures such as those disclosed in U.S. Pat. Nos. 2,945,894; 2,951,100; 2,973,391; and 3,069,480. Alternatively, chlorination of the alkyl group or groups of the appropriate methyl benzene, methyl naphthalene or methyl anthracene in the presence of suitable catalysts, see U.S. Pat. No. 2,926,202, or with chlorine absorbed on zeolite and under reactive conditions, see U.S. Pat. No. 2,956,084, may be effected.

The novel compounds of the instant invention are prepared according to the above general reaction in an organic solvent which is inert to the reaction and the components thereof. Methanol has been found to be a convenient solvent, however, other alcohols may also be used. The reaction is best conducted in the presence of a proton acceptor such as a strong base e.g. potassium or sodium hydroxide, in amounts equivalent to the amount of hydrogen halide evolved.

The reaction is conducted at a temperature ranging from about 10° to about 60°C. under atmospheric pressure. Subatmospheric or superatmospheric pressure can be used, if desired. No catalysts are necessary.

The compounds represented by Formula A, above, may be incorporated into the thermoplastic polymers to which they are to impart flame-retardance in amounts ranging from about 10% to about 15%, by weight, based on the weight of the polymer.

The poly (phosphine oxides) may be incorporated into the polymers by any known method. For example, the oxide may be combined with the polymer by milling the two on a two-roll mill, mixing in a Banbury mixer, extrusion, injection molding and the like. The oxide may also be incorporated into the polymer by adding it to the polymerization media during the polymer manufacture, provided the ingredients, catalysts etc. therein are inert thereto.

The thermoplastic polymers into which the novel poly (phosphine oxides) may be incorporated to produce the novel compositions of the instant invention are generally those produced from at least one ethylenically unsaturated monomer, wherein the monomer, or monomers, are polymerized, by any known method, via the ethylenic unsaturation therein. Preferred examples of polymers conforming to this definition include the polyolefins i.e. those polymers produced from ethylene, propylene etc. including copolymers thereof with such monomers as vinyl acetate etc. and homopolymers thereof i.e. polyethylene; polypropylene etc.; I may also use such polymers as the linear aromatic polyesters such as polyethylene terephthalate; polybutylene terephthalate; poly(1,4-cyclohexanedimethylene)-terephthalate etc.; the polyalkylene oxides such as polyethylene oxide; nylon; butadiene polymers such as the so-called "impact polymers" i.e. acrylonitrile-butadiene-styrene polymers; acrylonitrile-styrene-methyl methacrylate grafted polybutadiene etc. Further examples of applicable polymers which may be flame-proofed using my novel compounds are set forth in U.S. Pat. No. 3,284,543, referred to above, and hereby incorporated herein by reference.

It is within the scope of the present invention to incorporate such ingredients as plasticizers, dyes, pigments, fillers, stabilizers, antioxidants, antistatic agents etc. into my novel compositions without detracting from the advantageous properties exhibited thereby.

The following examples are set forth for purposes of illustration only and are not to be construed as limitations on the present invention except as set forth in the appended claims. All parts and percentages are by weight except where specified otherwise.

ILLUSTRATIVE METHOD — PREPARATION OF p-DIBROMOMETHYL DURENE

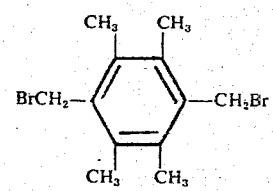

A solution of 1760 ml. of concentrated sulfuric acid in 1740 ml. of glacial acetic acid is prepared. A slurry of 444 parts of durene, 580 parts of paraformaldehyde and 1900 parts of sodium bromide in 3720 ml. of glacial acetic acid is heated to 80°C. and the sulfuric acid solution is added thereto over a period of 3 hours to give a thick, cream-colored slurry. The slurry is heated at 85°C. for 1 hour, cooled to 5°C. and filtered. The resultant filter cake is washed three times with 400 ml. of acetic acid, reslurried twice in 4000 ml. of water, reslurried again twice in 2500 ml. of 5% sodium bicarbonate solution and again twice in 5000 ml. of water. The recovered filter cake is then dried at 50°C. 992 parts of the desired product, p-dibromomethyl durene, m.p. 214.5°–215°C., are recovered. The product is a white powder. The yield is 93%.

EXAMPLE 1

A slurry of 880 parts of bis(2-cyanoethyl)phosphine oxide and 819 parts of the p-dibromomethyl durene produced above in 13,000 ml. of methanol is prepared and stirred as 374 parts of potassium hydroxide in 1800 ml. of methanol are added thereto at such a rate as to maintain the temperature below 40°C. The slurry is heated to reflux and, after 30 minutes, cooled to 5°C. and filtered. The resultant filter cake is reslurried three times in 1800 ml. of acetone, filtered, reslurried twice in 10 liters of water, filtered and dried to yield 1130 parts of 1,4-bis[bis(2-cyanoethyl)phosphonylmethylene]-2,3,5,6-tetramethyl benzene. The product is a white powder having a melting point of 299°–300°C. The crude product is then recrystallized from boiling dimethylformamide to yield 1817 parts in two crops. Final melting point is 308°–308.5°C.

EXAMPLE 2

Following the procedure of Example 1, there is obtained 1,2,4,5-tetrakis[bis(2-cyanoethyl)phosphonylmethylene]benzene from 1,2,4,5-tetrabromomethyl benzene and bis(2-cyanoethyl)phosphine oxide. The product has a melting point of 345°–347°C.

EXAMPLE 3

Again following the procedure of Example 1, bis(2-cyanoethyl)phosphine oxide and 2,4,6-tribromomethyl benzene are reacted to produce 2,4,6-tris[bis(2-cyanoethyl)phosphonylmethylene]mesitylene having a melting point of 237°–241°C.

EXAMPLE 4

1,4-dibromomethyl benzene is reacted with bis(2-cyanoethyl)phosphine oxide according to the procedures set forth in Example 1 to yield 1,4-phenylenebis[bis(2-cyanoethyl)phosphonylmethylene] having a melting point of 201°–203°C.

EXAMPLE 5

Again using the technique of Example 1, 1,3-dimethyl-4,6-dibromomethyl benzene is reacted with bis(2-cyanoethyl)phosphine oxide to yield 4,6-bis[bis(2-cyanoethyl)phosphonylmethylene]-1,3-dimethyl benzene having a melting point of 151°–153°C.

EXAMPLE 6

The procedure of Example 5 is again followed except that the halobenzene intermediate is replaced by 1,4-dimethyl-2,5-dibromomethyl benzene. 2,5-Bis[bis(2-cyanoethyl)phosphonylmethylene]-1,4-dimethyl benzene, having a melting point of 242°–245°C., is recovered.

EXAMPLE 7

When the procedure of Example 5 is again followed except that the halobenzene intermediate thereof is replaced by 2,5-dibromomethyl-1,4-dimethoxybenzene, 2,5-bis[bis(2-cyanoethyl)phosphonylmethylene]-1,4-dimethoxybenzene, having a melting point of 229°–231°C., is recovered.

EXAMPLE 8

Again following the procedure of Example 1, 1,5-dibromomethyl naphthalene is reacted with bis(2-cyanoethyl)phosphine oxide utilizing a 50/50 mixture of methanol and dimethylsulfoxide as solvent. The resultant product, 1,5-bis[bis(2-cyanoethyl)phosphonylmethylene]naphthalene has a melting point of 226°–228°C.

EXAMPLE 9

Following the procedure of Example 8, there is obtained 9,10-bis[bis(2-cyanoethyl)phosphonylmethylene]anthracene from bis(2-cyanoethyl)phosphine oxide and 9,10-dibromomethylanthracene. The product has a melting point of 320°–330°C.

EXAMPLE 10

The procedure of Example 8 is again followed except that the halobenzene intermediate is replaced by 5,8-dibromomethyltetralin. 5,8-Bis[bis(2-cyanoethyl)phosphonylmethylene]tetralin having a melting point of 228°–230°C. is recovered.

EXAMPLE 11

When the procedure of Example 1 is again followed except that the halobenzene intermediate is replaced by 2,4-dibromomethyl-1,3,5-trimethylbenzene, 2,4-bis[bis(2-cyanoethyl)phosphonylmethylene]-1,3,5-trimethylbenzene having a melting point of 174°–176°C. is recovered.

Following the procedures of Example 1, above, various other poly (phosphine oxides) are produced by reacting bis(2-cyanoethyl)phosphine oxide with various bromomethyl benzenes, naphthalenes and anthracenes. The various charge materials and the products produced therefrom are set forth in Table I, below.

EXAMPLE 21

To polypropylene containing 0.1% of pentaerythriyl tetrakis (3,5-di-t-butyl-4-hydroxyphenyl)propionate and 0.25% of distearylthiodipropionate is added 10%, by weight, based on the weight of the polymer, of the 1,4-bis-[bis(2-cyanoethyl)phosphonylmethylene]-2,3,5,6-tetramethylbenzene of Example 1 by milling at 350°F. on a standard plastic mill. The resultant composition is then compression molded into bars (⅛ inch × 5 inches × ½ inch) at 400°–420°F. The bars are then tested according to ASTM D635-70 horizontal burning test modified using 3–4 test specimens. The flammability rating is "self-extinguishing."

When a similar amount of the compound of Example 1 of U.S. Pat. No. 3,284,543 is incorporated into the same polymer in the same manner and molded and tested, as above, the flammability rating is "free-burning."

EXAMPLES 22–26

Various of the novel poly (phosphine oxides) of the

Table I

| EX. | BROMOMETHYL BENZENE | PRODUCT |
|---|---|---|
| 12 | Hexabromomethylbenzene | Hexa[bis(2-cyanoethyl)phosphonylmethylene]benzene |
| 13 | 1,4-dibromomethyl-2,3,5,6-tetraethoxybenzene | 1,4-bis[bis(2-cyanoethyl)phosphonylmethylene]-2,3,5,6-tetrathoxybenzene |
| 14 | 1,4-dibromomethyl-2,5-diethylbenzene | 1,4-bis[bis(2-cyanoethyl)phosphonylmethylene]-2,5-diethylbenzene |
| 15 | 1,2,4,5,6-pentabromomethyl benzene | 1,2,4,5,6-penta[bis(2-cyanoethyl)phosphonylmethylene]benzene |
| 16 | 2,5-dibromomethyl-1,4-diethyl-3,6-dimethoxybenzene | 2,5-bis[bis(2-cyanoethyl)phosphonylmethylene]-1,4-diethyl-3,6-dimethoxybenzene |
| 17 | 2,3,5-tribromomethyl naphthalene | 2,3,5-tris[bis(2-cyanoethyl)phosphonylmethylene]naphthalene |
| 18 | 2,3,6-tribromomethyl anthracene | 2,3,6-tris[bis(2-cyanoethyl)phosphonylmethylene]anthracene |
| 19 | 2,6,9,10-tetrabromomethyl anthracene | 2,6,9,10-tetra[bis(2-cyanoethyl)phosphonylmethylene]anthracene |
| 20 | 2-methoxy-1,6-dibromo naphthalene | 1,6-bis[bis(2-cyanoethyl)phosphonylmethylene]-2-methoxy naphthalene | instant invention is dry blended at 10%, by weight, based on the weight of the terephthalate, with polyethylene terephthalate and the dry blend is melted and stirred under nitrogen for 5–6 minutes at 300°–310°C. The resultant mixture is then cooled, ground to a powder and laminated onto a fiberglass sheet by compression molding at 600°F. The recovered laminated sheets are then cut into strips 2 inches × 6 inches × 0.030 inch and tested according to the Oxygen Index method of ASTM D2863-70 modified to accept the above test specimens. In this test, the higher the oxygen index, the better the flame-retardance. The results are set forth in Table II, below. Additional sample strips are also subjected to hot water leaching according to Underwriter's Laboratory Water Extraction Test, Subject 746, Mar. 1, 1957, paragraph E6 and then burned. The water extraction test requires that the samples be immersed in water at 70°C. for 7 days, the water being changed daily for the first 5 days. The samples are dried in a dessicator after the immersion tests and before they are subjected to the above ASTM Oxygen Index test. The results are set forth in Table III, below.

Table II

| Ex. | Product of Example No. | Oxygen-Index Value |
|---|---|---|
| 22C | Control-terephthalate alone | 19.6 |
| 23 | 1 | 24.1 |
| 24 | 2 | 24.1 |
| 25 | 3 | 23.3 |
| 26 | 4 | 23.9 |

Table III

| Ex. | Flame-Retardant Added | Oxygen Index Value Before Extraction | After Extraction |
|---|---|---|---|
| 27 | Control-Terephthalate Alone | 19.6 | 19.6 |
| 28 | That of Example 1 above | 24.1 | 23.9 |
| 29 | That of Example 1 of U.S. 3,284,543 | 24.1 | 21.2 |

EXAMPLES 30–41

When the products produced in Examples 5–7 and 12–20 were tested in polyethylene terephthalate according to the above Oxygen Index Test, results similar to those shown in Table II were achieved.

EXAMPLES 42–58

Following the procedure described for Example 21, various poly (phosphine oxides) of the instant invention are milled with various polymers and tested according to the test set forth therein. The results are set forth in Table IV, below.

Table IV

| Ex. | Arylenebisphosphene Oxide | Polymer | Test Results |
|---|---|---|---|
| 42 | That of Ex. 2 - 15% | Polyethylene | passed |
| 43 | That of Ex. 3 - 10% | Polybutylene terephthalate | do. |
| 44 | That of Ex. 5 - 10% | Polypropylene | do. |
| 45 | That of Ex. 6 - 10% | Poly(1,4-cyclohexanedimethylene) terephthalate | do. |
| 46 | That of Ex. 7 - 10% | Same as Ex. 42 | do. |
| 47 | That of Ex. 12 - 10% | Polypropylene | do. |
| 48 | That of Ex. 13 - 10% | Polypropylene | do. |
| 49 | That of Ex. 14 - 15% | Same as Ex. 42 | do. |
| 50 | That of Ex. 15 - 10% | Polyethylene | do. |
| 51 | That of Ex. 17 - 10% | Polypropylene | do. |
| 52 | That of Ex. 18 - 10% | do. | do. |
| 53 | That of Ex. 19 - 10% | do. | do. |
| 54 | That of Ex. 20 - 10% | do. | do. |
| 55 | That of Ex. 8 - 10% | do. | do. |
| 56 | That of Ex. 9 - 10% | do. | do. |
| 57 | That of Ex. 10 - 12% | do. | do. |
| 58 | That of Ex. 11 - 15% | do. | do. |

I claim:

1. A flame-retarded composition comprising (1) a polyolefin or a linear aromatic polyester and (2) a flame-retarding amount of a compound having the formula

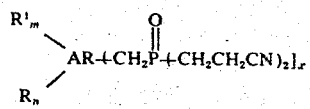

wherein R and $R^1$ are, individually, methyl, ethyl or methoxy radicals, AR is benzene, naphthalene or anthracene and when AR is benzene, $n$ and $m$ are, individually, whole integers of 0–2, inclusive, $x$ is a whole integer of 2–6, inclusive, and R and $R^1$ can combine to form a saturated, six-membered hydrocarbon ring in conjunction with two adjacent carbon atoms of the benzene ring, when AR is naphthalene, $n$ and $m$ are, individually, whole integers of 0–3, inclusive, and $x$ is a whole integer of 2–4, inclusive, and when AR is anthracene, $n$ and $m$ are, individually, whole integers of 0–4, inclusive, and $x$ is a whole integer of 2–6, inclusive.

2. A composition according to claim 1 wherein (1) is a polyolefin.

3. A composition according to claim 1 wherein (1) is polypropylene.

4. A composition according to claim 1 wherein (1) is a linear aromatic polyester.

5. A composition according to claim 1 wherein (1) is polyethylene terephthalate.

6. A composition according to claim 1 wherein AR is benzene, R and $R^1$ are methyl and $x$, $n$ and $m$ are 2.

7. A composition according to claim 1 wherein AR is benzene, $x$ is 4 and $n$ and $m$ are 0.

8. A composition according to claim 1 wherein AR is naphthalene. $x$ is 2 and $n$ and $m$ are 0.

9. A composition according to claim 1 wherein AR is benzene, R is methyl, $x$ is 2, $n$ is 2 and $m$ is 0.

* * * * *